May 7, 1929.  T. E. BERGELAND  1,711,485
HARROW
Filed Nov. 17, 1927  2 Sheets-Sheet 2
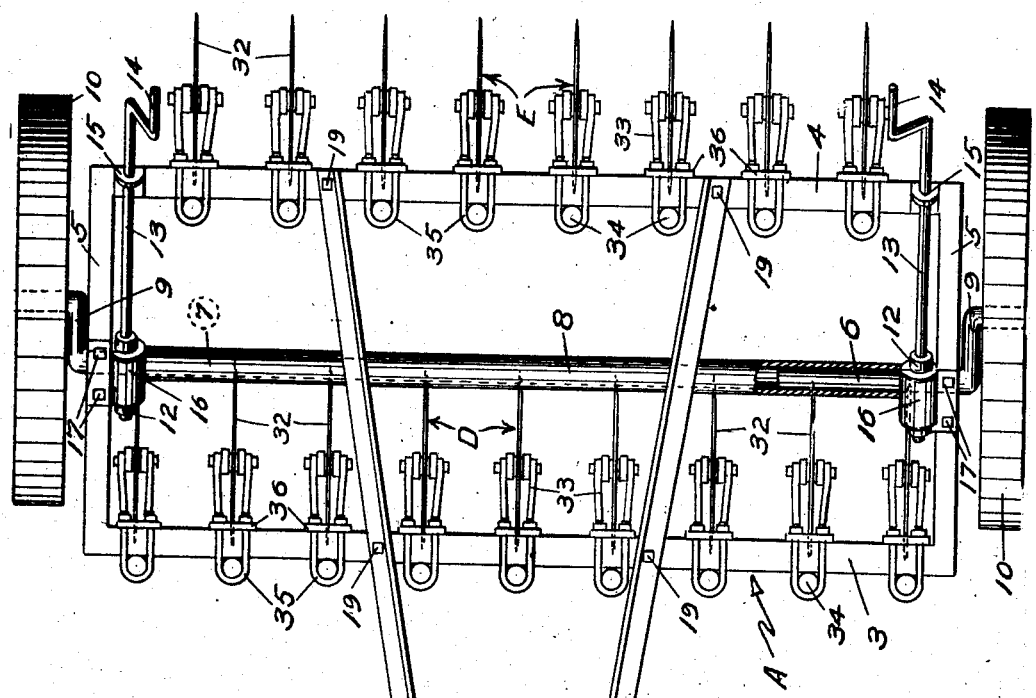
Fig. 2.
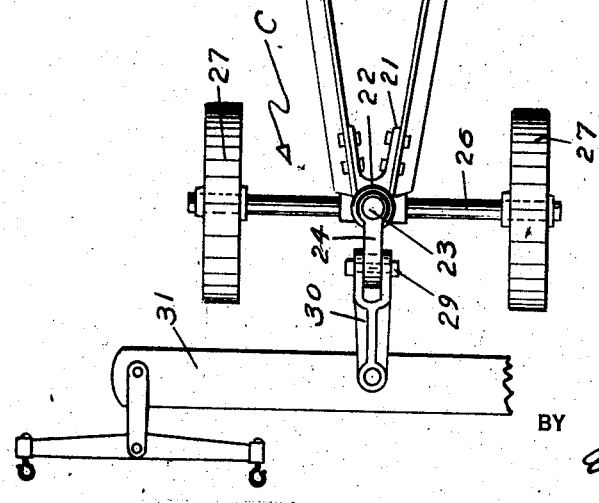
INVENTOR
T. E. BERGELAND
BY
ATTORNEY Patented May 7, 1929.

1,711,485

UNITED STATES PATENT OFFICE.

TOBIAS E. BERGELAND, OF DAWSON, MINNESOTA.

HARROW.

Application filed November 17, 1927. Serial No. 233,920.

This invention relates to harrows, and the primary object is to provide a practical, efficient and comparatively simple construction of harrow, of the colter type, which may be drawn over a newly plowed field, and, when so drawn, will cut and break up the lumps and clods of earth and sod, so that it will be better prepared for seeding, cultivating and other operations incident to the raising of crops. Further and more specific objects will be disclosed in the course of the following specification, reference being had to the accompanying drawings, in which:

Fig. 2 is a plan view of the machine as shown in Fig. 1, but with the seat removed, and with a fractional portion in section, for purpose of illustration.

Figure 1:
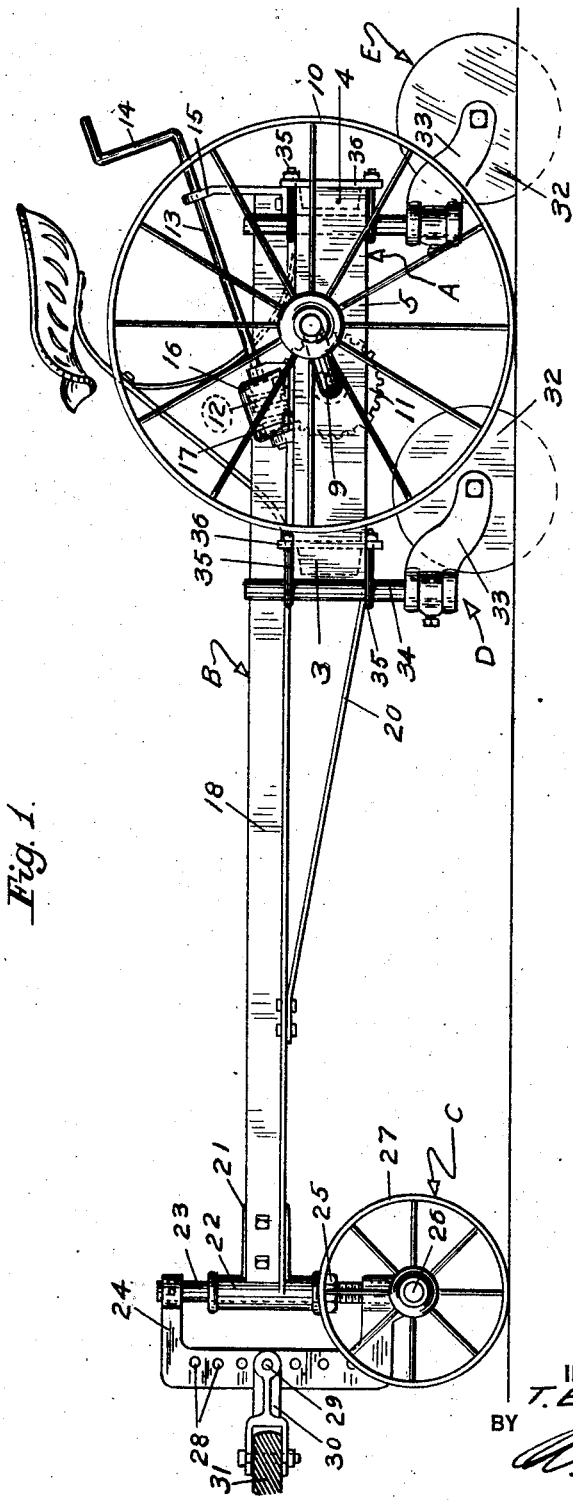
Fig. 1 is a side elevation of the machine.

Referring to the drawings more particularly and by reference characters, A designates a rectangular frame, having a pair of cross beams 3 and 4 connected by end beams 5. This frame may be constructed of wood or metal; and is indicated, by dotted lines in Fig. 1, as made of channel iron.

The frame A is supported on a pair of shafts 6 and 7, which are connected and braced in alignment by a sleeve or tubular shaft 8. The outer ends of the shafts 6 and 7 are provided with cranks 9 that serve as axles for the supporting wheels 10. The shafts 6 and 7 are provided, immediately within the end beams 5, with worm gears 11, that mesh with the worms 12 of a pair of shafts 13 having handles 14. The shafts 13 have bearings, as at 15, and also journal in the worm housings 16 secured to the end beams 5, as at 17. A mechanism is thus provided for angling the cranks 9 and thereby raising and lowering the frame A with respect to the ground wheels 10. It is necessary to provide means for so vertically adjusting the frame A in order that the working depth of the harrow tools may be regulated, and also so that the tools may be entirely lifted from the ground, as when the machine is running idle over the field or road.

It may here be noted that the wheels may be connected by a single integral shaft, having an end crank for each wheel, but in that event an inclined transverse adjustment is not possible, and as the weight of the machine might be too great for a single adjusting crank, it is preferable to operatively separate the shafts and provide independent adjustments for both.

The frame A is retained in a normal, substantially horizontal position by V-shaped, forwardly extending frame B, consisting of two converging angle iron bars 18, secured as at 19 to the frame A, and preferably having a pair of reinforcing or draft braces 20, extending under the frame A.

The forward ends of the bars 18 are secured to a casting 21 having a sleeve 22 that is vertically adjustable and pivots on a shaft 23 carried in a yoke 24 of a forecarriage C. The sleeve 22 rests on a nut 25 that threads on the lower end of the shaft 23, and the adjustment thus permitted is sufficient so that the frame A may be kept substantially horizontal when the harrow tools are adjusted to various working depths.

The yoke 24 is carried on the shaft 26 of a pair of wheels 27, and is provided with vertically spaced holes 28 for selective engagement by a pin 29 of a clevis 30 to which the power connecting element 31 is attached.

The frame beam 3 is provided with a row of colters D and the beam 4 is provided with a similar row of colters E, but the colters of each row are offset with respect to the colters of the other row, with a result that the colters of the rear row will cut centrally into the strips of soil traversed or spanned by the respective pairs of colters of the front row. This arrangement will permit of effectively cutting the soil into comparatively narrow strips, such as cannot be done by a single row of colters, because, if the colters were to be placed close enough together (assuming that their mountings would so permit) they would not have room to operate properly. The colter blades 32 are of the plane, disk cutting type, which rotate in mounting brackets 33 that swivel on bars 34 secured to the main frame by suitable means such as U-bolt clips 35 and anchor plates 36. The pivoting actions of the brackets 33 on the bars 34 permits the colter disks to follow slightly irregular paths as rocks and ground conditions may demand, and by arranging the colter units as described, it will be seen that the colters will have full freedom for lateral movement, but will still cut relatively narrower strips than would otherwise be possible.

It is understood that suitable modifications may be made in the general design and structural details of the invention as herein shown and described, provided, however, that such modifications come within the spirit and scope of the appended claim. Having now therefore fully shown and described my invention, what I claim to be new and desire to protect by Letters Patent is:

A harrow comprising a main frame, colters carried by the frame and vertically adjustable therewith, laterally spaced ground wheels for supporting the frame, a fore-carriage in advance of the frame, a frame extension device extending from the main frame to the fore-carriage, and means for connecting the extension device and forecarriage whereby the former will be vertically adjustable and pivotally connected with respect to the latter, the said connecting means comprising a vertical bar on the carriage, and a sleeve member, on the extension device, rotatable and adjustable on the bar.

In testimony whereof I affix my signature.

TOBIAS E. BERGELAND.